United States Patent [19]

Ferguson

[11] 4,175,728
[45] Nov. 27, 1979

[54] ADJUSTABLE CABLE CLAMP FOR USE WITH BELTED CABLES

[75] Inventor: Thomas R. Ferguson, Levittown, Pa.

[73] Assignee: Burroughs Corporation, Detroit, Mich.

[21] Appl. No.: 8,610

[22] Filed: Feb. 1, 1979

[51] Int. Cl.² .............................................. B25B 5/14
[52] U.S. Cl. .................................... 269/91; 24/16 R; 248/71; 269/100; 269/254 R; 269/321 WE
[58] Field of Search .................... 248/71; 269/91, 100, 269/254 R, 287, 321 WE; 24/16 R, 20 R, 21 R, 263 R, 265 H

[56] References Cited
U.S. PATENT DOCUMENTS

| | | | |
|---|---|---|---|
| 2,918,240 | 12/1959 | Wiegand | 24/16 R |
| 3,605,200 | 9/1971 | Vallinotto et al. | 24/20 |
| 3,760,811 | 9/1973 | Andrew | 24/263 R |

*Primary Examiner*—Robert C. Watson

*Attorney, Agent, or Firm*—Francis A. Varallo; Leonard C. Brenner; Kevin R. Peterson

[57] ABSTRACT

The present disclosure describes an improved clamp for use with belted cables in the assembly of electronic equipment. In performing its clamping function, the device is adapted to engage the chassis structure upon which the cables are to be routed and terminated. The clamp design is characterized by its effectiveness with a single flat cable or a bundle of such cables. An increase in the clamping pressure exerted upon the cables results in a proportional increase in the force with which the clamp engages the chassis. This assures that the clamp will remain firmly in place during the assembly operation. Moreover, during such operation, the clamp may be easily removed to permit the addition of another cable and then reapplied. Finally, when the wiring of the cable bundle has been completed, the clamp may optionally be removed for use at another location or permitted to remain permanently in place.

7 Claims, 2 Drawing Figures

ADJUSTABLE CABLE CLAMP FOR USE WITH BELTED CABLES

BACKGROUND OF THE INVENTION

The assembly of present day electronic equipment often involves the use of flat belted cables each having a multiplicity of conductors. Such equipment, exemplified by that used in the computer field, entails the respective routing of a large number of such cables arranged in a bundle and the termination of their electrical conductors. The cables in a bundle are arranged to lie on top of one another along a common longitudinal axis. In order to properly dress and fold-in each succeeding cable of the bundle, each cable must preferably be clamped at a predetermined height above the electrical equipment chassis to permit the wiring technician to use both hands for routing and terminating. As each cable is installed, the clamp must be removed to allow the next cable to be routed on top of the previous one, and then reapplied to permit a similar routing and folding operation.

A number of existing devices are available for clamping belted cables but each of these has been found to be deficient in one or more of the areas of effectiveness and versatility, cost, time and labor required for its use. For example, some flat cable clamps are suitable for handling only relatively small cable bundles, that is, of approximately up to a dozen cables. In actual practice in the computer field, it is not uncommon to have as many as approximately fifty cables in a bundle which must be clamped as a unit. Some available clamps have very limited adjustment for varying cable heights and in order to use such clamps on large bundles, additional hardware is required to raise the clamp to the proper height. Such hardware not only raises the material cost of the device but increases the assembly and disassembly time. Other clamps, such as the well-known type manufactured by Dakota Engineering Inc. under the trademark CAB-L-TITE, provide effective clamping action only after a predetermined cable bundle height has been achieved. That is, they lack the adjustability required for clamping a range of cable thicknesses from a single cable up to a specified maximum number of cables. The aforementioned well-known clamp requires a separate keeper to engage the teeth-like projections on a portion of the outer surfaces of the U-shaped horns or legs. Moreover, the base of the clamp is adapted to be fastened to a surface, thereby making it difficult to remove the clamp after the installation of the cable bundle has been completed. Finally, various cable wrapping or tying methods capable of handling large cable bundles have been employed, but these require considerable time in their application and often the wrap must be destroyed each time it is removed in preparation for adding the next cable, thereby resulting in increased cost and material waste.

What is required is a low cost, simple clamping device which will effectively handle a wide range of cable heights, is easily applied or removed by finger pressure, requires no additional hardware to perform its function and is capable of being easily removed after the cable assembly is complete or alternately may be left permanently in place. The cable clamp of the present invention fulfills these requirements.

SUMMARY OF THE INVENTION

In accordance with the present invention, there is provided a cable clamp preferably formed in one piece and having a substantially U-shaped configuration. The opposed inner surfaces of the respective pair of legs of the "U" include a plurality of homologously disposed ratchet-like teeth. The base section of the clamp supports the pair of legs, each of which is oriented in orthogonal relationship therewith. An arcuate spring member having its longitudinal axis substantially parallel with that of the base section is attached along its central transverse axis to the inner surface of the base. That is, the spring member lies between the pair of legs. The outer surface of the base section includes a pair of spaced-apart projections serving as finger grips to be used by the technician during the cable assembly operation.

In use, the initial flat cable or cables to be routed and terminated are disposed on the equipment chassis between two spaced-apart apertures provided in the latter. The clamp is positioned by the technician over the cable by inserting the pair of legs into the respective chassis apertures. The clamp is then pushed toward the chassis until the spring member contacts the cables. At this point, additional downward pressure on the clamp causes the teeth to forcibly engage the chassis material on opposed edges of the respective apertures, thereby holding the cable firmly in place. As will be described hereinafter, pressure on the clamp actually causes the legs to tend to move toward each other, resulting in the clamp engaging the chassis with increased force. After the termination of the initial cables, removal of the clamp to add additional cables is accomplished simply by squeezing the finger grip projections toward each other while pressing downward slightly against the cable. This causes the clamp legs to move outward, away from each other, thereby releasing the chassis from the teeth and permitting the clamp to be withdrawn. The additional cable or cables may then be laid upon the initial ones, and the clamp reapplied in the manner previously described. When the assembly operation has been completed, the clamp may either be withdrawn or permitted to remain in place.

These and other features and advantages of the invention will become more fully apparent in the detailed description of the device which follows.

DESCRIPTION OF THE PREFERRED EMBODIMENT

Figure 1:
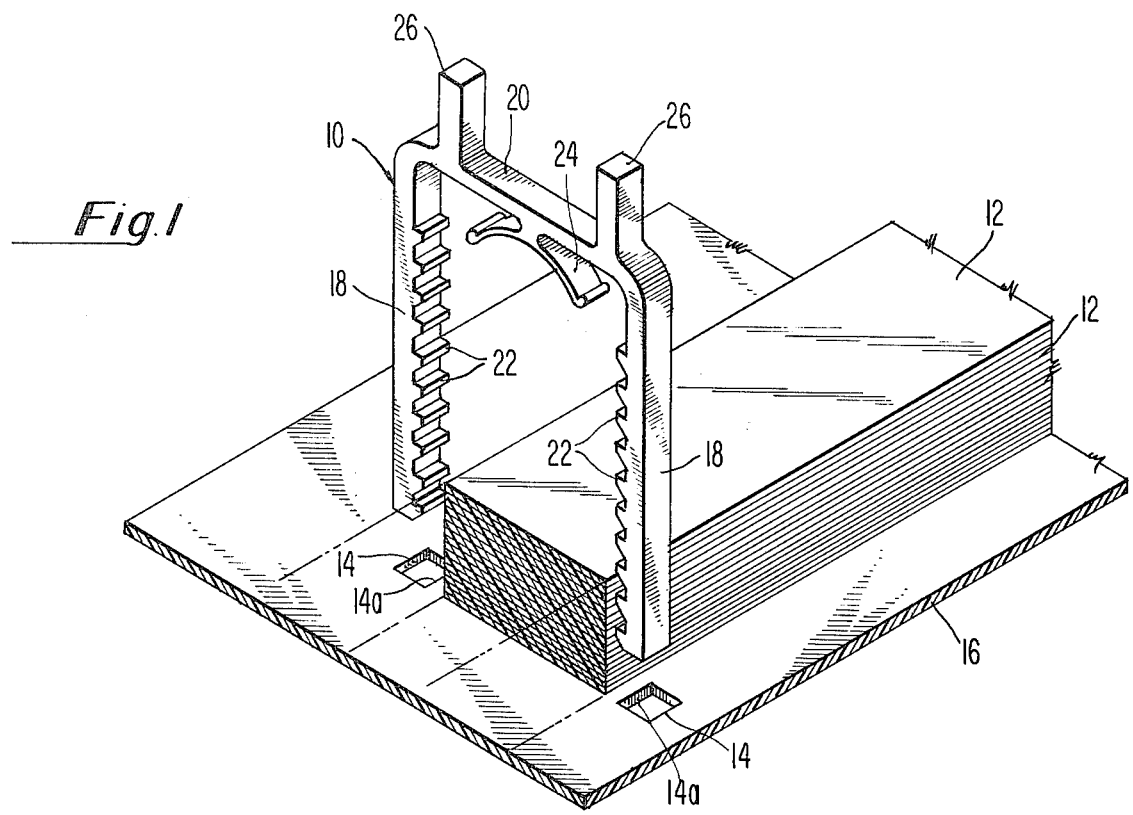
FIG. 1 is a pictorial illustration of the clamp of the present invention shown just prior to its application to a multiplicity of flat cables and the chassis which it will engage during its clamping function.

As illustrated in FIG. 1, the cable clamp 10 of the present invention is shown in relation to a plurality of flat cables 12 positioned between rectangular apertures 14 formed in a metallic electrical equipment chassis 16.

The clamp 10 has a generally U-shpaed configuration comprised of a pair of legs 18, supported by a base 20. The legs 18 include respective pluralities of ratchet-like teeth 22 homologously disposed along opposed inner surfaces thereof. An arcuate spring member 24 is attached to the inner surface of base 20, within the legs 18. The outer surface of base 20 includes a pair of projections 26 which provide finger grips useful in the repetitive removal of the clamp during the assembly operation.

In an assembly operation, one or more of the cables 12 to be routed and terminated are placed on the equipment chassis 16 between two spaced-apart apertures 14 punched or otherwise formed therein as seen in FIG. 1. The extremities of the legs 18 are simultaneously inserted into the apertures 14 by the technician and the clamp 10 is pushed toward the cables 12. Finger pressure on the clamp may be applied to the outer surface of the base section between the projections 26 or concurrently to the opposite sides of the projections. The chassis material adjacent the opposed inner edges 14a of the apertures 14 successively passes over the inclined portions of the successive corresponding ratchet-like teeth 22 on respective legs 18 as the clamp 10 is applied. After the spring 24 has contacted the cables 12, additional pressure applied to clamp 10 causes the next set of teeth 22 to engage the chassis 16. When the finger pressure upon the clamp 10 is released, the chassis 16 comes to rest upon those portions of teeth 22 which are orthogonal to the longitudinal axes of the respective legs 18. The purpose of the spring 24 is to take up any slack within one pitch increment of the teeth 22. The cables 12 are now held firmly in place against the chassis 16.

Removal of the clamp for the purpose of adding one or more additional cables is readily accomplished by squeezing the finger grip projections 26 toward each other. This causes the legs 18 to move away from each other, thereby releasing the chassis 16 from the teeth 22. The clamp 10 may now be completely withdrawn. After the additional cable has been laid upon the initial ones, the clamp may be reapplied to clamp the cable bundle as a unit.

Figure 2:
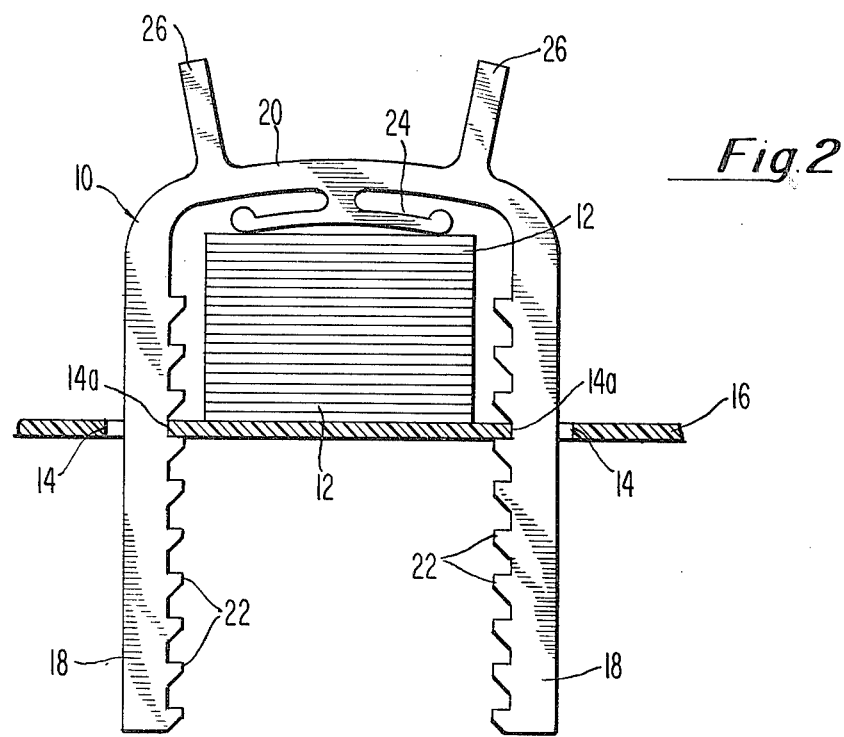
FIG. 2 illustrates the action of the clamp of FIG. 1 in applying considerable pressure to the cable bundle and in which the deformation of the clamp material has been exaggerated to indicate how the chassis is gripped with increased force by the clamp under such conditions.

With reference of FIG. 2, the deformation in base section 20 of the material of which clamp 10 is formed has been exaggerated to emphasize the gripping action on the chassis 16. As increased pressure is applied to the spring member 22 preferably by concurrent finger pressure on opposite sides of the projections 26, that is, directed generally along the longitudinal axes of the legs 18, the extremities of the spring 24 move toward the inner surface of base 20. Moreover since the cross-sectional thickness of the material in base 10 is considerably less than that of the legs 18 to increase its flexibility, base 10 bows slightly, causing the legs 18 to tend to move toward each other. The relaxation of the finger pressure on the clamp is countered somewhat by the pressure of the spring 24 against the cables 18, thereby causing chassis 16 to be locked between corresponding teeth of the respective legs 18, with increased force applied thereto due to the bowing of base 10. The action of the legs 18 in applying a continuous increased gripping force upon the chassis insures that the clamp will not become accidentally disengaged during the assembly operation.

With continued reference to FIGS. 1 and 2, it should be observed that the clamp 10 may be fabricated in one piece such as by machining or molding. Actual operative clamps have been made using thermoplastic polyester (VALOX) and acetal homopolymer (DELRIN). These materials were selected because of their good spring qualities, low moisture absorption, good strength and resistance to fatigue.

It is apparent that the versatility of clamp 10 recommends it for a variety of applications. The physical dimensions of the clamp will necessarily need to be chosen in accordance with the specific application. For example, the thickness and width of each cable must be considered as well as the maximum number of cables expected to be bundled as a unit. Such a selection of appropriate dimensions is well within the skill of the mechanical designer. The following details of an actual operative clamp as taught herein are included solely for purposes of example and are not to be construed as limitative of the invention.

A clamp 10 having legs 18 approximately 2 inches in length and separated from each other by a minimum distance of 1.44 inches (between the tops of corresponding teeth 22) has been used to accommodate approximately fifty flat cables, each being approximately 0.03125 inches thick and 1.3 inches wide. The dimensions of the cross section of each of legs 18 are approximately 0.187 inches deep by 0.234 inches in width (including the tooth depth which is typically 0.062 inches). As compared with the leg cross section, that of the base 20 is also 0.187 inches in depth but only 0.120 inches in width. This last dimension provides the flexibility in the base 20 needed to achieve the clamping action depicted in FIG. 2.

The thickness of the chassis 16 employed with the aforementioned clamp was within the range of 0.0625 inches to 0.094 inches. Accordingly the space provided between adjacent teeth 22 is chosen to accommodate the range of chassis thicknesses. The distance between corresponding root depths of the teeth in respective legs is approximately equal to or slightly greater than the distance between the edges 14a of the apertures 14. Thus, a significant holding force is only exerted upon the chassis by legs 18 under the conditions described in connection with FIG. 2.

In conclusion, it is submitted that the cable clamp of the present invention offers a convenient, economical, time saving means of cable assembly in electronic equipment. As noted hereinbefore, changes and modifications of the clamp may be needed to suit particular requirements. Such variations as are within the skill of the designer, and which do not depart from the true scope and spirit of the invention are intended to be covered by the following claims.

I claim:

1. A clamp for use with at least a single belted electrical cable routed between a pair of apertures formed in an equipment chassis comprising:

a substantially U-shaped structure including a pair of legs and a base, said base supporting said legs in substantial orthogonal relationship therewith and in parallel spaced-apart relationship with each other, said pair of legs having respective pluralities of homologously disposed teeth on opposed inner surfaces thereof, a spring member disposed on the inner surface of said base between said pair of legs, a pair of spaced-apart projectons disposed on the outer surface of said base, said pair of legs being adapted to be inserted respectively in said pair of apertures formed in said chassis and to be advanced in the direction of said cable until said spring member is in firm contact therewith, said chassis then being forcibly engaged by corresponding teeth in the respective pair of legs, the subsequent removal of said clamp being effected by the movement of said pair of projections toward each other and the resultant disengagement of said teeth with said chassis.

2. A clamp as defined in claim 1 further characterized in that the cross-sectional thickness of the material in said base is selected to be substantially less than that of each of said pair of legs to insure the flexibility of said base, said base assuming a bowed configuration during the application of pressure by said clamp to said cable, whereby said pair of legs tend to move toward each other and thereby to engage said chassis with increased force.

3. A clamp as defined in claim 2 further characterized in that said spring member is of generally arcuate configuration, said spring member having its longitudinal axis substantially parallel with that of said base and being attached along its central transverse axis to that of said base.

4. A clamp as defined in claim 3 wherein said teeth are ratchet-like in configuration, the chassis material adjacent said pair of apertures passing over the inclined portions of said teeth during application of said clamp to said cable and resting upon the orthogonal portions of corresponding teeth in the respective pair of legs when the clamp is fully applied.

5. A clamp as defined in claim 4 wherein the distance between adjacent teeth is selected to accommodate the thickness of the chassis material.

6. A clamp as defined in claim 5 wherein the distance between corresponding root depths of the teeth in the respective legs is substantially equal to the minimum distance between opposed edges of said pair of apertures.

7. A clamp as defined in claim 6 wherein said substantially U-shaped structure is formed in one piece of material possessing good spring qualities and strength, low moisture absorption and resistance to fatigue.

* * * * *